US012654408B2

(12) United States Patent
Kendall et al.

(10) Patent No.: US 12,654,408 B2
(45) Date of Patent: Jun. 16, 2026

(54) SYSTEM AND METHOD FOR SEAL VALIDATION IN A COMPOSITE PART MANUFACTURING PROCESS

(71) Applicant: The Boeing Company, Arlington, VA (US)

(72) Inventors: James R. Kendall, Mt. Pleasant, SC (US); Kieran J. Tay, North Charleston, SC (US); Santiago M. Mejia, Charleston, SC (US); Samantha Eberhardt, Charleston, SC (US)

(73) Assignee: The Boeing Company, 929 Long Bridge Drive, Arlington, VA (US)

( * ) Notice: Subject to any disclaimer, the term of this patent is extended or adjusted under 35 U.S.C. 154(b) by 0 days.

(21) Appl. No.: 18/890,301

(22) Filed: Sep. 19, 2024

(65) Prior Publication Data

US 2025/0222663 A1     Jul. 10, 2025

Related U.S. Application Data

(60) Provisional application No. 63/618,790, filed on Jan. 8, 2024.

(51) Int. Cl.
| | |
|---|---|
| *B29C 70/54* | (2006.01) |
| *B29C 33/00* | (2006.01) |
| *B29C 37/00* | (2006.01) |

(52) U.S. Cl.
CPC ........ *B29C 70/544* (2021.05); *B29C 33/0038* (2013.01); *B29C 37/00* (2013.01); *B29C 70/549* (2021.05); *B29C 2037/90* (2013.01)

(58) Field of Classification Search
CPC .... B29C 37/0089; B29C 70/44; B29C 70/544
See application file for complete search history.

(56) References Cited

U.S. PATENT DOCUMENTS

| | | | | |
|---|---|---|---|---|
| 8,628,639 B2 * | 1/2014 | Thompson | .......... | B29C 37/0064 |
| | | | | 156/286 |
| 9,862,144 B2 | 1/2018 | Lane et al. | | |
| 2009/0243128 A1 * | 10/2009 | Nelson | .................. | B29C 70/549 |
| | | | | 425/170 |

* cited by examiner

*Primary Examiner* — James Sanders
(74) *Attorney, Agent, or Firm* — Kunzler Bean & Adamson

(57) ABSTRACT

A system for validating seal integrity includes a part forming tool having a supporting surface against which a composite part is formed and a surrounding surface. A caul sheet overlays the part. A vacuum bag is coupled to a perimeter of the caul sheet and disposed against the surrounding surface. The vacuum bag is coupled to the surrounding surface via an outer seal and an outer vacuum chamber is defined between the surrounding surface and the vacuum bag. An inner seal couples the vacuum bag to a perimeter of the caul sheet such that an inner vacuum chamber is defined between the caul sheet, the vacuum bag, and the supporting surface. A flow sensor is fluidically coupled with each vacuum chamber. A valve is selectively operable to fluidically couple and decouple the chamber and the vacuum source and/or to fluidically couple and decouple the chamber and an atmospheric pressure source.

20 Claims, 9 Drawing Sheets

1000

SYSTEM AND METHOD FOR SEAL VALIDATION IN A COMPOSITE PART MANUFACTURING PROCESS

FIELD

This disclosure relates generally to composite manufacturing processes, and more particularly to autoclave composite manufacturing processes.

BACKGROUND

Composite materials have become integral in various industries due to their lightweight, durable, and versatile nature. Manufacturing of composite parts involves complex processes and/or autoclaves to apply heat and pressure to form and cure composite materials. An important aspect of this manufacturing process is ensuring the integrity of seals that enable a negative pressure environment within one or more chambers, such as those defined by vacuum bags. The negative pressure within a chamber urges the vacuum bag against the composite material. This pressure forces the composite material against a shaping tool, which shapes the composite material into a desired shape. Maintaining the integrity of the seals helps prevent defects in and ensures the quality and structural soundness of the final composite part.

SUMMARY

The subject matter of the present application has been developed in response to the present state of the art, and in particular, in response to the shortcomings associated with traditional methods of validating seal integrity in a composite part manufacturing process that have not yet been fully solved by currently available techniques. Accordingly, the subject matter of the present application has been developed to provide systems and methods of validating seal integrity that overcome at least some of the above-discussed shortcomings of prior art techniques.

Disclosed herein is a system for validating seal integrity in a composite part manufacturing process. The system comprises a part forming tool comprising a supporting surface against which a composite part is formed, and a surrounding surface substantially surrounding the supporting surface. The system also comprises a caul sheet comprising a perimeter. The caul sheet is configured to overlay at least a portion of the composite part. The system further comprises a vacuum bag coupled to the perimeter of the caul sheet such that the vacuum bag substantially surrounds the caul sheet and is disposed against at least a portion of the surrounding surface of the part forming tool. The system additionally comprises an outer vacuum chamber defined between the surrounding surface of the part forming tool and the vacuum bag. The vacuum bag is coupled to the surrounding surface of the part forming tool via an outer seal created by the outer vacuum chamber. The system also comprises an inner vacuum chamber defined between the caul sheet, the vacuum bag, and the supporting surface of the part forming tool. The perimeter of the caul sheet is coupled to the vacuum bag via an inner seal. The system further comprises an inner flow sensor fluidically coupled with the outer vacuum chamber and configured to measure a first flow rate of a first fluid within the outer vacuum chamber. The system additionally comprises an outer flow sensor fluidically coupled with the inner vacuum chamber and configured to measure a second flow rate of a second fluid within the inner vacuum chamber. The system also comprises a vacuum source and an outer valve selectively operable to fluidically couple and decouple the outer vacuum chamber and the vacuum source. The system additionally comprises an inner valve selectively operable to fluidically couple and decouple the inner vacuum chamber and the vacuum source, and fluidically couple and decouple the inner vacuum chamber and an atmospheric pressure source. The preceding subject matter of this paragraph characterizes example 1 of the present disclosure.

The system further comprises a controller configured to concurrently control operation of the outer valve to fluidically couple the outer vacuum chamber to the vacuum source, and control operation of the inner valve to fluidically decouple the inner vacuum chamber from the vacuum source and to fluidically couple the inner vacuum chamber to the atmospheric pressure source. The system also comprises a controller configured to compare the first flow rate and the second flow rate when the outer vacuum chamber and the vacuum source are fluidically coupled, when the inner vacuum chamber and the vacuum source are fluidically decoupled, and when the inner vacuum chamber and the atmospheric pressure source are fluidically coupled, and identify the seal integrity of the outer seal and the inner seal based on the comparison of the first flow rate and the second flow rate. The preceding subject matter of this paragraph characterizes example 2 of the present disclosure, wherein example 2 also includes the subject matter according to example 1, above.

The controller is configured to identify the seal integrity of the outer seal as non-leaking and identify the seal integrity of the inner seal as non-leaking when the comparison indicates a value of the first flow rate, in an equilibrium state, and a value of the second flow rate, in an equilibrium state, are zero. The preceding subject matter of this paragraph characterizes example 3 of the present disclosure, wherein example 3 also includes the subject matter according to example 2, above.

The controller is configured to identify the seal integrity of the outer seal as non-leaking and identify the seal integrity of the inner seal as leaking when the comparison indicates a value of the first flow rate, in an equilibrium state, is positive and no more than a predetermined threshold, and a value of the second flow rate, in an equilibrium state, is negative. The preceding subject matter of this paragraph characterizes example 4 of the present disclosure, wherein example 4 also includes the subject matter according to any of examples 2-3, above.

The controller is configured to identify the seal integrity of the outer seal as leaking and identify the seal integrity of the inner seal as leaking when the comparison indicates the value of the first flow rate, in the equilibrium state, is positive and greater than the predetermined threshold and the value of the second flow rate, in the equilibrium state, is negative. The preceding subject matter of this paragraph characterizes example 5 of the present disclosure, wherein example 5 also includes the subject matter according to any of examples 2-4, above.

The controller is configured to identify the seal integrity of the outer seal as leaking and identify the seal integrity of the inner seal as non-leaking when the comparison indicates a value of the first flow rate, in an equilibrium state, is positive, and a value of the second flow rate, in an equilibrium state, is zero. The preceding subject matter of this paragraph characterizes example 6 of the present disclosure, wherein example 6 also includes the subject matter according to any of examples 2-5, above.

The system further comprises a third vacuum chamber defined between the part forming tool and the vacuum bag. The vacuum bag is coupled to the part forming tool via a third seal. A third flow sensor is fluidically coupled with the third vacuum chamber and configured to measure a failsafe flow rate of a third fluid within the third vacuum chamber. The preceding subject matter of this paragraph characterizes example 7 of the present disclosure, wherein example 7 also includes the subject matter according to any of examples 2-6, above.

The controller is configured to identify the seal integrity of the inner seal as non-leaking and identify the seal integrity of the third seal as non-leaking when the comparison indicates a value of the second flow rate, in an equilibrium state, and a value of the failsafe flow rate, in an equilibrium state, are zero. The preceding subject matter of this paragraph characterizes example 8 of the present disclosure, wherein example 8 also includes the subject matter according to example 7, above.

The controller is configured to identify the seal integrity of the inner seal as non-leaking and identify the seal integrity of the third seal as leaking when the comparison indicates a value of the second flow rate, in an equilibrium state, is positive and no more than a predetermined threshold, and a value of the failsafe flow rate, in an equilibrium state, is negative. The preceding subject matter of this paragraph characterizes example 9 of the present disclosure, wherein example 9 also includes the subject matter according to any of examples 7-8, above.

The inner valve is selectively operable between a first mode wherein the inner vacuum chamber is fluidically decoupled from the vacuum source and fluidically coupled to the atmospheric pressure source, and a second mode wherein the inner vacuum chamber is fluidically coupled with the vacuum source and fluidically decoupled from the atmospheric pressure source. The preceding subject matter of this paragraph characterizes example 10 of the present disclosure, wherein example 10 also includes the subject matter according to any of examples 1-9, above.

The inner valve comprises a first flow regulator configured to regulate flow between the inner vacuum chamber and the vacuum source, and a second flow regulator configured to regulate flow between the inner vacuum chamber and the atmospheric pressure source. The second flow regulator is separately controllable by the controller relative to the first flow regulator. The preceding subject matter of this paragraph characterizes example 11 of the present disclosure, wherein example 11 also includes the subject matter according to any of examples 1-10, above.

The system further comprises multiple outer vacuum chambers, multiple outer flow sensors and multiple outer valves. The surrounding surface of the part forming tool comprises a plurality of zones each comprising a corresponding one of the multiple outer vacuum chambers, the multiple outer flow sensors, and the multiple outer valves. The preceding subject matter of this paragraph characterizes example 12 of the present disclosure, wherein example 12 also includes the subject matter according to any of examples 1-11, above.

The part forming tool further comprises at least one groove formed in the surrounding surface, and wherein the outer vacuum chamber is defined within the at least one groove. The preceding subject matter of this paragraph characterizes example 13 of the present disclosure, wherein example 13 also includes the subject matter according to any of examples 1-12, above.

The at least one groove is fluidically coupled with the vacuum source when the outer valve and the groove are open to the outer vacuum chamber such that the first fluid is drawn from the outer vacuum chamber through the groove when the outer valve is open. The preceding subject matter of this paragraph characterizes example 14 of the present disclosure, wherein example 14 also includes the subject matter according to example 13, above.

When the at least one groove is fluidically coupled with the vacuum source, the vacuum bag is sealed against the at least one groove, and wherein the seal between the vacuum bag and the at least one groove defines the outer seal. The preceding subject matter of this paragraph characterizes example 15 of the present disclosure, wherein example 15 also includes the subject matter according to example 14, above.

Further disclosed herein is a method for validating seal integrity in a composite part manufacturing process. The method comprises sealing a vacuum bag to a part forming tool via an outer seal such that an outer vacuum chamber is defined between the part forming tool and the vacuum bag. The part forming tool comprises a supporting surface against which a composite part is formed and a surrounding surface substantially surrounding the supporting surface. The method also comprises sealing a perimeter of a caul sheet to the vacuum bag via an inner seal such that the caul sheet overlays the composite part. An inner vacuum chamber is defined between the part forming tool, the caul sheet, and the vacuum bag. The method further comprises fluidically coupling the outer vacuum chamber to a vacuum source. The method additionally comprises fluidically coupling the inner vacuum chamber to an atmospheric pressure source. The method also comprises actuating the vacuum source to draw a first fluid from the outer vacuum chamber. The method further comprises, when the first fluid is drawn from the outer vacuum chamber via the vacuum source, measuring a first flow rate of the first fluid within the outer vacuum chamber via an inner flow sensor and measuring a second flow rate of a second fluid within the inner vacuum chamber via an outer flow sensor. The method additionally comprises identifying a seal integrity of the outer seal and the inner seal by comparing the first flow rate and the second flow rate. The preceding subject matter of this paragraph characterizes example 16 of the present disclosure.

Identifying the seal integrity of the outer seal and the inner seal comprises identifying the seal integrity of the outer seal as non-leaking and identifying the seal integrity of the inner seal as non-leaking when the comparison indicates a value of the first flow rate, in an equilibrium state, and a value of the second flow rate, in an equilibrium state, are zero. The preceding subject matter of this paragraph characterizes example 17 of the present disclosure, wherein example 17 also includes the subject matter according to example 16, above.

Identifying the seal integrity of the outer seal and the inner seal comprises identifying the seal integrity of the outer seal as non-leaking and identifying the seal integrity of the inner seal as leaking when the comparison indicates a value of the first flow rate, in an equilibrium state, is positive and no more than a predetermined threshold, and a value of the second flow rate, in an equilibrium state, is negative. The preceding subject matter of this paragraph characterizes example 18 of the present disclosure, wherein example 18 also includes the subject matter according to any of examples 16-17, above.

Identifying the seal integrity of the outer seal and the inner seal comprises identifying the seal integrity of the outer seal as leaking and identifying the seal integrity of the inner seal as leaking when the comparison indicates a value of the first flow rate, in an equilibrium state, is positive and greater than the predetermined threshold, and a value of the second flow rate, in an equilibrium state, is negative. The preceding subject matter of this paragraph characterizes example 19 of the present disclosure, wherein example 19 also includes the subject matter according to any of examples 16-18, above.

Identifying the seal integrity of the outer seal and the inner seal comprises identifying the seal integrity of the outer seal as leaking and identifying the seal integrity of the inner seal as non-leaking when the comparison indicates a value of the first flow rate, in an equilibrium state, is positive, and a value of the second flow rate, in an equilibrium state, is zero. The preceding subject matter of this paragraph characterizes example 20 of the present disclosure, wherein example 20 also includes the subject matter according to any of examples 16-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Validation of seal integrity of the seals of a composite part manufacturing system helps prevent gas-based defects in a composite part formed by the system. Traditionally, leak detection and/or seal integrity validation requires performing multiple pressure drop tests, which include closing off system evacuation ports and monitoring the level of pressure within one or more vacuum chambers. An increase in pressure may indicate air is leaking into the system via a compromised seal. If the pressure increases above a predetermined amount, a leak is presumed to exist. The leak must then be located, fixed, and the process repeated to verify that no other leaks are present. This process is expensive, in terms of both time and labor. Disclosed herein are various examples of a system and method that, when used in conjunction with an autoclave, reduce the time and labor associated with the validation of seal integrity. The system and method of the present disclosure facilitate accurate and efficient seal validation and leak detection, which helps to prevent manufacturing defects in composite parts.

Figure 1:
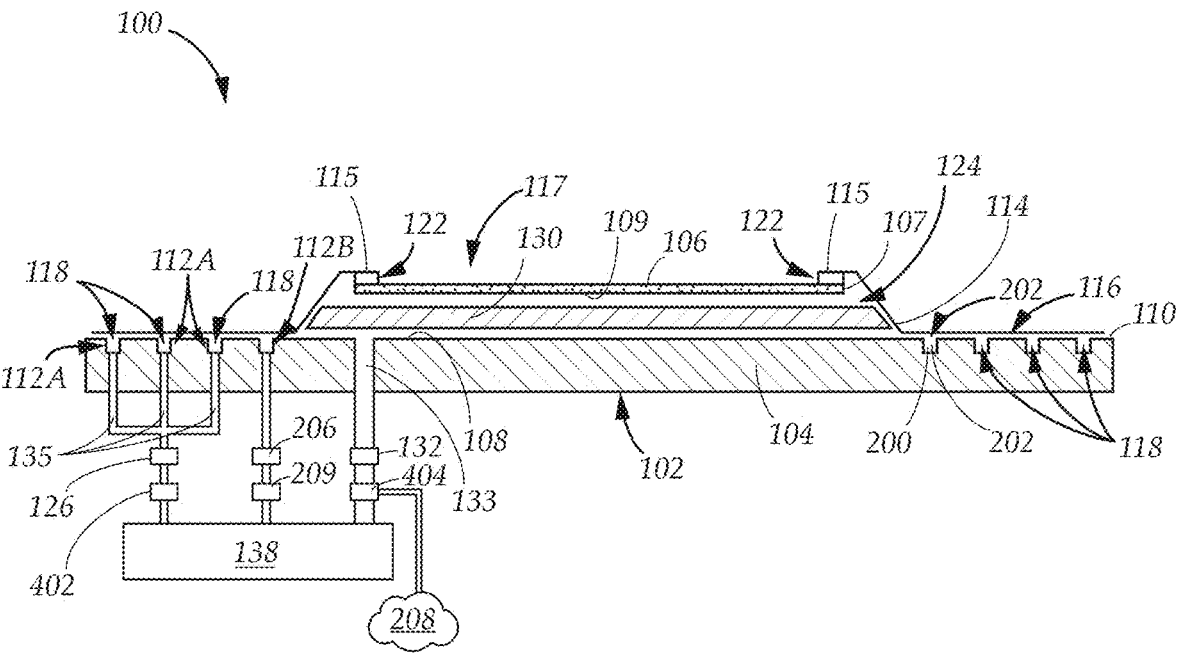
FIG. 1 is a cross-sectional view of a system for validating seal integrity in a composite part manufacturing process, according to some embodiments of the present disclosure.

Referring to FIG. 1, according to some embodiments, a seal validation system 100 for validating seal integrity in a composite part manufacturing process includes a part forming tool 102 for use in conjunction with an autoclave (not shown). The part forming tool 102 is made of a rigid, heat-resistant, and thermally-conductive material, such as a metal or ceramic material configured to support and shape a composite material into a composite part 130. In some embodiments, the composite material of the composite part 130 includes fibers embedded in a thermoset or thermoplastic resin, and/or other suitable material. The composite material can be a laminate panel, which includes multiple stacked layers of composite material.

In some embodiments, the part forming tool 102 includes a mandrel 104, which can have a one-piece or seamless construction, that includes a supporting surface 108 against which the composite part 130 is formed, and a surrounding surface 110 substantially surrounding the supporting surface 108. In these and other embodiments, the mandrel 104 may be monolithically formed as a single unit. In some embodiments, the mandrel 104 includes more than one part welded, joined, or otherwise coupled together. The supporting surface 108 includes dimensions sufficient to accommodate the composite part 130 and is shaped to impart a desired shape to the composite part 130. In operation, the composite part 130 may be placed on top of the supporting surface 108 and a caul sheet 106 may be placed on top of the composite part 130. In other words, the composite part 130 may be sandwiched between the supporting surface 108 of the part forming tool 102 and a bottom surface 109 of the caul sheet 106.

As mentioned, the supporting surface 108 is molded or shaped to impart desired shapes, contours, textures, and/or other features to a portion of the composite part 130 in contact therewith. For example, in some embodiments, the supporting surface 108 is substantially flat, curved, angled, polygonal, textured, smooth, and/or a combination thereof. Similarly, the bottom surface 109 of the caul sheet 106 may be formed to include one or more shapes, contours, textures, and/or other features configured to define an opposite portion or side of the composite part 130 during a composite manufacturing process.

In one embodiment, the supporting surface 108 of the mandrel 104 is sloped or angled such that a corresponding exterior side of the composite part 130 is similarly sloped or angled. In these and other embodiments, the bottom surface 109 of the caul sheet 106 may be smooth or flat such that the opposite exterior side of the composite part 130 may be flattened against the supporting surface 108 upon application of a vacuum force by the seal validation system 100. In other embodiments, the bottom surface 109 of the caul sheet 106 may be uniquely shaped or contoured, and/or may include different features relative to the supporting surface 108. In this manner, opposite sides of the composite part 130 may not be identical and the supporting surface 108 and/or caul sheet 106 may include any desired shape, contour, texture, and/or feature.

In some embodiments, the caul sheet 106 includes a semi-rigid, heat-conductive material configured to transfer heat to the composite part 130. In some embodiments, the caul sheet 106 includes a reduced thickness relative to a thickness of the mandrel 104. The thickness of the caul sheet 106 may or may not be uniform. In certain embodiments, the caul sheet 106 includes a single sheet monolithically formed as a single unit. In other embodiments, the caul sheet 106 includes more than one portion welded, fastened, or otherwise joined together by a seam.

In some embodiments, the caul sheet 106 includes a size and or shape substantially corresponding to a desired size and/or shape of the composite part 130 such that the caul sheet 106 is configured to overlay at least a portion of the composite part 130. In some embodiments, the shape of the caul sheet 106 may be substantially square, rectangular, polygonal, circular, or may include any desired regular or irregular shape. In certain embodiments, the caul sheet 106 includes a perimeter 107 configured to substantially align with a periphery of the composite part 130. In other embodiments, however, the perimeter 107 of the caul sheet 106 may extend beyond the periphery of the composite part 130 or a surface area of the caul sheet 106 may be less than a surface area of the composite part 130. In some embodiments, the caul sheet 106 is coupled to a vacuum bag 114 of the seal validation system 100 at the perimeter 107 of the caul sheet 106. For example, the perimeter 107 of the caul sheet 106 can be sized and shaped to correspond with an opening 117 in the vacuum bag 114, such that a portion of the vacuum bag 114 surrounding the opening 117 overlaps with the perimeter 107 of the caul sheet 106.

In some embodiments, the vacuum bag 114 is substantially flexible such that the vacuum bag 114 substantially conforms to at least a portion of the part forming tool 102 and/or the composite part 130. In some embodiments, the vacuum bag 114 or sheet includes one or more flexible and substantially elastomeric materials such as silicone elastomers, natural rubber, styrene-butadiene block copolymers, polyisoprene, polybutadiene, ethylene propylene rubber, ethylene propylene diene rubber, fluoroelastomers, polyurethane elastomers, nitrile rubber, combinations thereof, and/or the like. In other embodiments, the vacuum bag 114 includes polyamide and/or polyethylene. In certain embodiments, the vacuum bag 114 includes a composite fiber membrane that may include at least a partially cured matrix bonding material, such as epoxy. In some examples, the vacuum bag 114 is reusable to form multiple composite parts in separate manufacturing processes.

In certain embodiments, the vacuum bag 114 substantially surrounds the caul sheet 106. One or more edges 115 of the vacuum bag 114, surrounding the opening 117, may be coupled to a corresponding portion of the perimeter 107 of the caul sheet 106 via an adhesive and/or another suitable bonding material or mechanical fastening technique, which forms an inner seal 122 between the vacuum bag 114 and the caul sheet 106. The inner seal 122 is configured to provide a hermetic seal. The integrity of the inner seal 122 must be maintained to create vacuum or negative pressure conditions within the vacuum bag 114 for forming the composite part 130. Accordingly, monitoring the integrity of the inner seal 122 before, during, or after formation of the composite part 130 is desired.

In some embodiments, the vacuum bag 114 includes dimensions sufficient to cover at least a portion of the surrounding surface 110 of the part forming tool 102 when the caul sheet 106 is disposed on top of the composite part 130. In this manner, the vacuum bag 114 may be disposed against at least a portion of the surrounding surface 110 of the part forming tool 102 when the caul sheet 106 is positioned on top of the composite part 130.

In some embodiments, the surrounding surface 110 of the part forming tool 102 includes at least one groove 112 extending around at least a portion of a periphery of the forming tool 102. At least one groove 112 is sized and shaped to surround the composite part 130 so that the composite part 130 is encompassed by the at least one groove 112 when formed. In other words, in one embodiment, the at least one groove 112 substantially encircles the supporting surface 108 and the supporting surface 108 is inscribed within the at least one groove 112. As will be described in more detail below, in certain examples, the supporting surface 108 includes multiple grooves 112, such as multiple outer grooves 112A and at least one failsafe groove 112B within and circumscribed by the multiple outer grooves 112A. When multiple outer grooves 112A are used, the outer grooves 112A can be fluidically coupled together via shared ports or fluid lines, such as shown in FIG. 1, or via breaks or conduits formed in the walls that separate the outer grooves 112A.

In some embodiments, the seal validation system 100 includes one or more vacuum chambers defined between the forming tool 102 and the vacuum bag 114. For example, in one embodiment, the part forming tool 102 and the vacuum bag 114 form an inner vacuum chamber 124 and an outer vacuum chamber 118. Each of the inner vacuum chamber 124 and the outer vacuum chamber 118 is configured to hermetically retain a volume of fluid such as oxygen, air, and/or any other suitable fluid.

In one embodiment, the outer vacuum chamber 118 is defined between at least one outer groove 112A of the surrounding surface 110 of the part forming tool 102 and the vacuum bag 114. As described in more detail below, the outer vacuum chamber 118 is formed when vacuum conditions within at least one outer groove 112A force the vacuum bag 114 to press against the surrounding surface 110 of the part forming tool 102 contiguous with the at least one outer groove 112A (e.g., against the edge of the outer groove 112A). The vacuum-induced contact between the vacuum bag 114 and the surrounding surface 110 creates a seal on both sides of the outer groove 112A, thus creating the outer vacuum chamber 118 within the at least one groove 112A. This seal defines at least a portion of an outer seal 116 of the seal validation system 100.

The inner vacuum chamber 124 is defined between the caul sheet 106, the supporting surface 108 of the part forming tool 102, and the vacuum bag 114. The inner vacuum chamber 124 is sealed by the inner seal 122 on one side of the inner vacuum chamber 124 and sealed by the outer seal 116 on another side of the inner vacuum chamber 124. The inner vacuum chamber 124 is configured to entirely cover and/or receive the composite part 130. The ability of the inner vacuum chamber 124 to maintain negative pressure therein is dependent on the integrity of the inner seal 122 and the outer seal 116. Accordingly, monitoring the integrity of the inner seal 122 and the outer seal 116 before, during, or after formation of the composite part 130 is desired.

Figure 3:
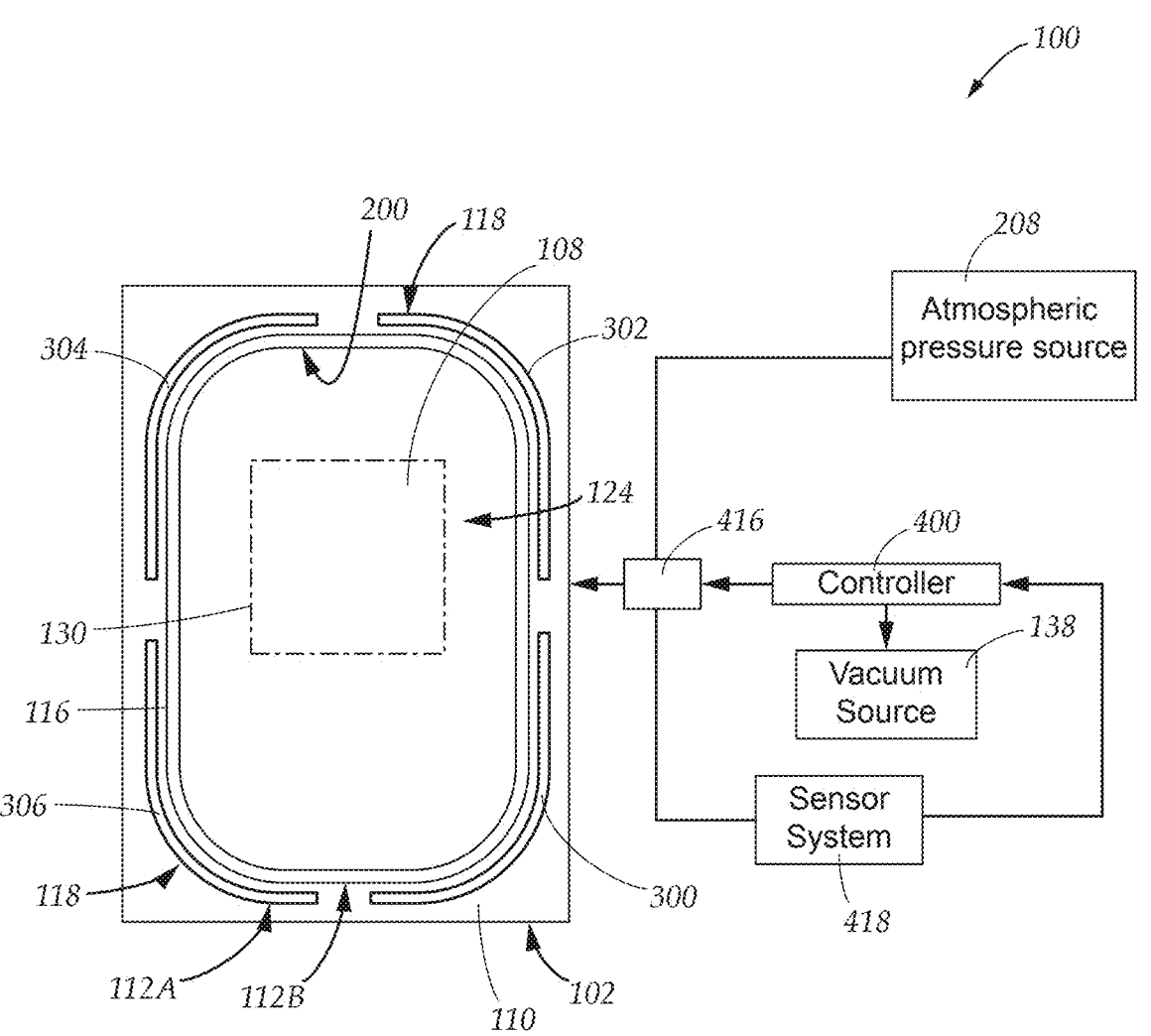
FIG. 3 is a schematic diagram of a system for validating seal integrity in a composite part manufacturing process, according to one or more examples of the present disclosure.

Referring to FIGS. 1 and 3, the seal validation system 100 further includes a vacuum source 138, a valve system 416, and a sensor system 418 all controlled by a controller 400 (which can be one unit or multiple separate units). The valve system 416 includes an outer valve 402 and an inner valve 404. The outer valve 402 may be selectively operable to fluidically couple and decouple the outer vacuum chamber 118 and the vacuum source 138. Similarly, the inner valve 404 may be selectively operable to fluidically couple and decouple the inner vacuum chamber 124 and the vacuum source 138. The inner valve 404 is further selectively operable to fluidically couple and decouple the inner vacuum chamber 124 and an atmospheric pressure source 208. The inner valve 404 may include a first flow regulator (not shown) configured to regulate flow between the inner vacuum chamber 124 and the vacuum source 138. In some embodiments, the inner valve 404 further includes a second flow regulator (not shown) configured to regulate flow between the inner vacuum chamber 124 and the atmospheric pressure source 208. In some embodiments, the second flow regulator (not shown) of the inner valve 404 is separately controllable relative to the first flow regulator (not shown).

In some embodiments, the inner valve 404 is selectively operable between a first mode where the inner vacuum chamber 124 is fluidically decoupled from the vacuum source 138 and fluidically coupled to the atmospheric pressure source 208 and a second mode where the inner vacuum chamber 124 is fluidically coupled with the vacuum source 138 and fluidically decoupled from the atmospheric pressure source 208.

The sensor system 418 is configured to measure fluid flow within the inner vacuum chamber 124 and the outer vacuum chamber 118. In some embodiments, the sensor system 418 includes an outer flow sensor 126 and an inner flow sensor 132. The outer flow sensor 126 is fluidically connected with the outer vacuum chamber 118 and is configured to measure a first flow rate 514 (see, e.g., the chart 508 of FIGS. 4B, 5B, 6B, and 7B) of a fluid within the outer vacuum chamber 118. Similarly, the inner flow sensor 132 may be fluidically coupled with the inner vacuum chamber 124 and configured to measure a second flow rate 516 of a fluid within the inner vacuum chamber 124. In the chart 508, the y-axis 510 is flow rate and the x-axis 516 is time.

The valves and the flow sensors can be fluidically coupled with the inner vacuum chamber 124 and the outer vacuum chamber 118 via one or more ports formed in the part forming tool 102. For example, the inner vacuum chamber 124 is fluidically coupled with the inner flow sensor 132 and the inner valve 404 via an inner port 133 formed in the part forming tool 102. Similarly, the outer vacuum chamber 118 is fluidically coupled with the outer flow sensor 126 and the outer valve 402 via multiple outer ports 135 formed in the part forming tool 102.

The controller 400 is configured to collect data and control operation of the valve system 416, the sensor system 418, and the vacuum source 138. In some embodiments, the controller 400 is configured to concurrently control operation of the outer valve 402 to fluidically couple the outer vacuum chamber 118 to the vacuum source 138, while also controlling operation of the inner valve 404 to fluidically decouple the inner vacuum chamber 124 from the vacuum source 138 and fluidically couple the inner vacuum chamber 124 to the atmospheric pressure source 208.

Referring now to FIGS. 4A-7B, in some embodiments, the controller 400 compares the first flow rate 514 and the second flow rate 516 under various circumstances. For example, in some embodiments, the controller 400 compares the first flow rate 514 and the second flow rate 516 when the outer vacuum chamber 118 and the vacuum source 138 are fluidically coupled, when the inner vacuum chamber 124 and the vacuum source 138 are fluidically decoupled, and when the inner vacuum chamber 124 and the atmospheric pressure source 208 are fluidically coupled. The controller 400 may then identify the seal integrity of the outer seal 116 and the inner seal 122 based on the comparison of the first flow rate 514 and the second flow rate 516.

Figures 4A, 4B:
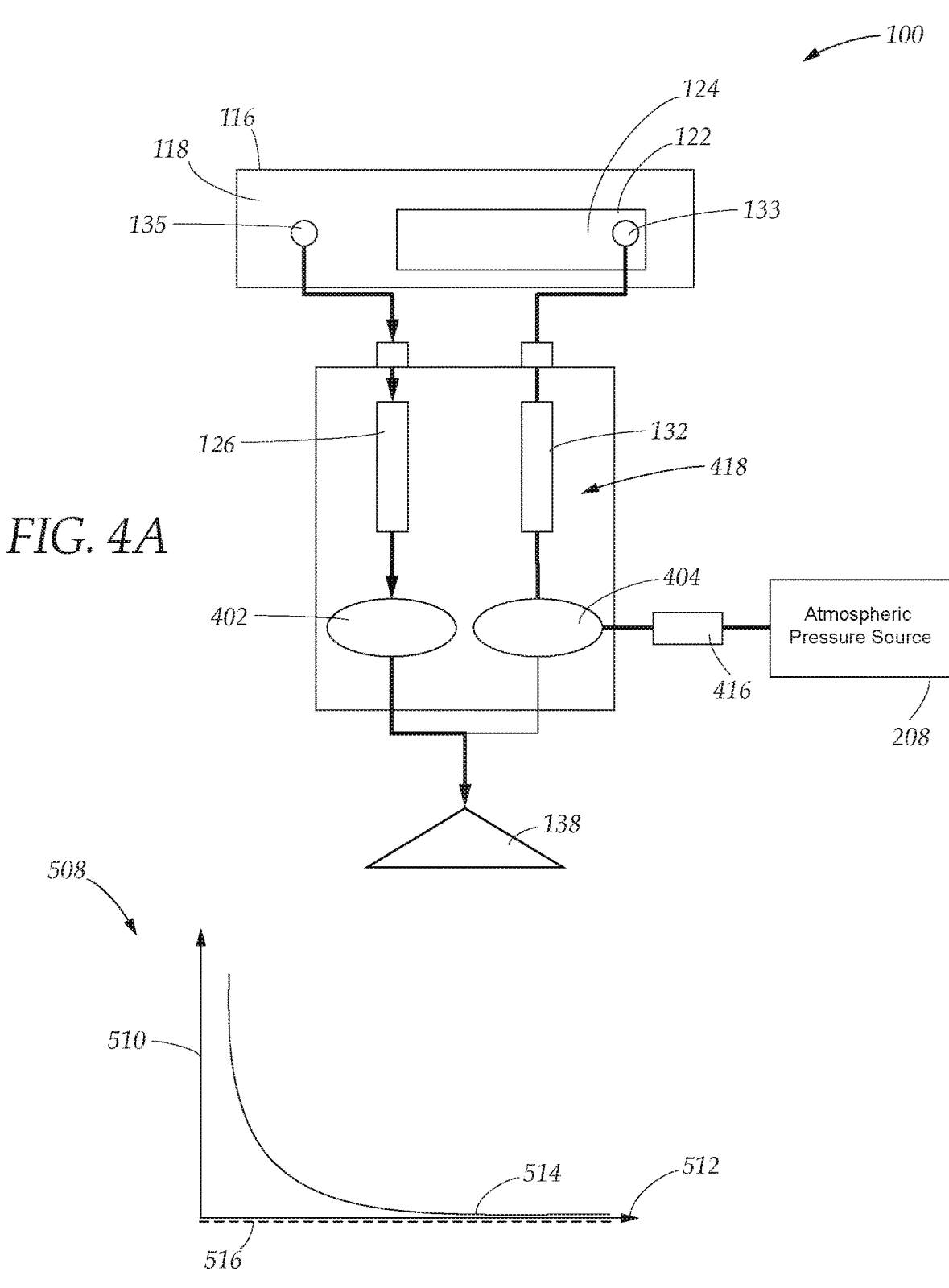
FIG. 4A is a schematic diagram of a system for validating seal integrity in a composite part manufacturing process, shown with the seals of the system in a first seal integrity state, according to one or more examples of the present disclosure.
FIG. 4B is a graph illustrating fluid flow across a first fluid sensor and a second fluid sensor of the system of FIG. 4A, when in the first seal integrity state.

Referring now to FIGS. 4A and 4B, in some embodiments, the controller 400 is configured to identify the seal integrity of the outer seal 116 as non-leaking and identify the seal integrity of the inner seal 122 as non-leaking (i.e., both the outer seal 116 and the inner seal 122 are functional) when the comparison indicates a value of the first flow rate 514, in an equilibrium state, and a value of the second flow rate 516, in an equilibrium state, are zero.

Figures 5A, 5B:
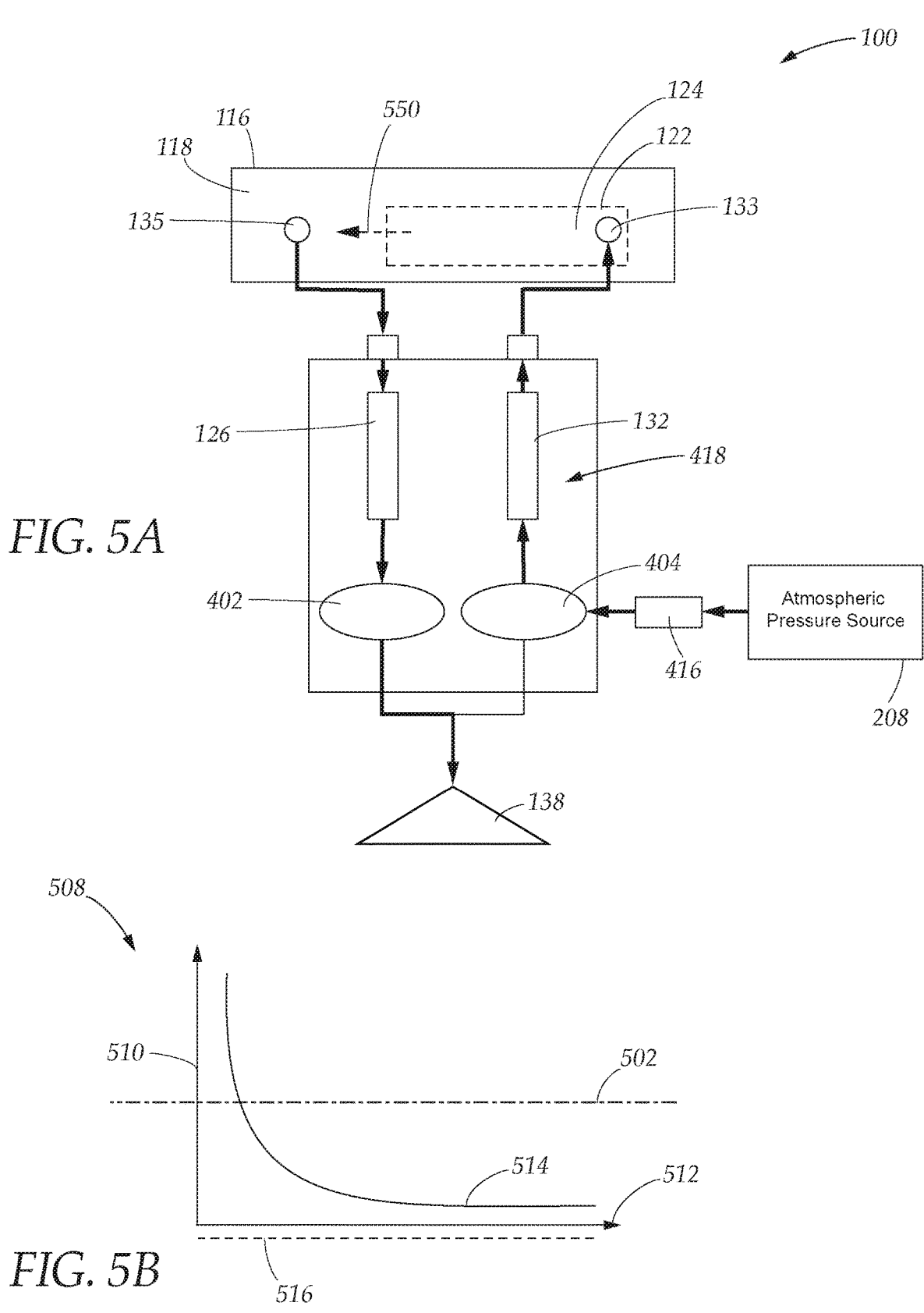
FIG. 5A is a schematic diagram of the system of FIG. 4A, shown with the seals of the system in a second seal integrity state, according to one or more examples of the present disclosure.
FIG. 5B is a graph illustrating fluid flow across a first fluid sensor and a second fluid sensor of the system of FIG. 4A, when in the second seal integrity state.

Referring now to FIGS. 5A and 5B, in some embodiments, the controller 400 is configured to identify the seal integrity of the outer seal 116 as non-leaking and identify the seal integrity of the inner seal 122 as leaking (see, e.g., fluid leaking from the inner vacuum chamber 124 through the inner seal 122 at 550) when the comparison indicates a value of the first flow rate 514, in an equilibrium state, is positive and no more than a predetermined threshold 502, and a value of the second flow rate 516, in an equilibrium state, is negative.

Figures 6A, 6B:
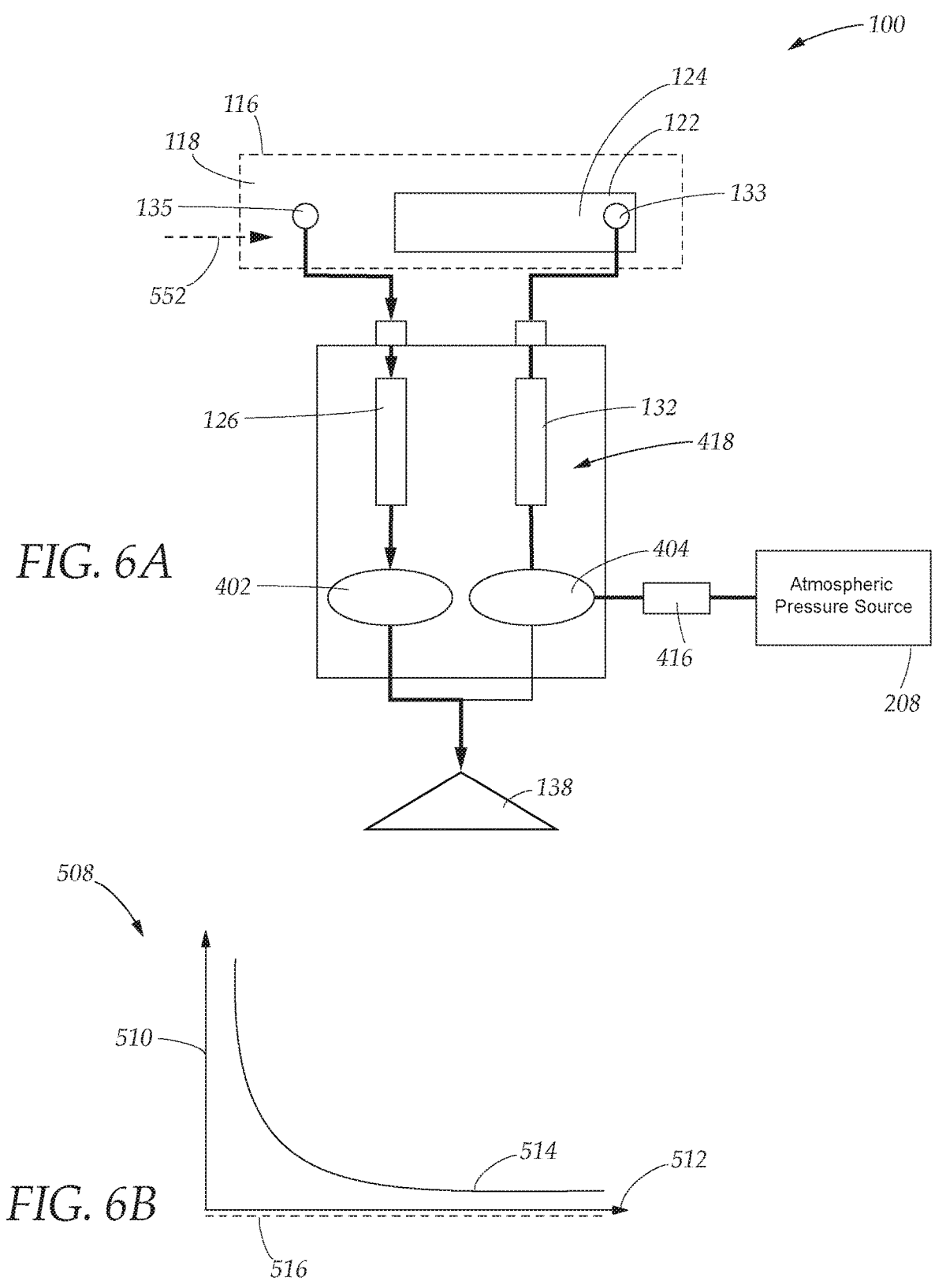
FIG. 6A is a schematic diagram of the system of FIG. 4A, shown with the seals of the system in a third seal integrity state, according to one or more examples of the present disclosure.
FIG. 6B is a graph illustrating fluid flow across a first fluid sensor and a second fluid sensor of the system of FIG. 4A, when in the third seal integrity state.

Referring now to FIGS. 6A and 6B, in some embodiments, the controller 400 is configured to identify the seal integrity of the outer seal 116 as leaking (see, e.g., fluid leaking into the outer vacuum chamber 118 through the outer seal 116 at 552) and identify the seal integrity of the inner seal 122 as non-leaking when the comparison indicates a value of the first flow rate 514, in an equilibrium state, is positive, and a value of the second flow rate 516, in an equilibrium state, is zero.

Figures 7A, 7B:
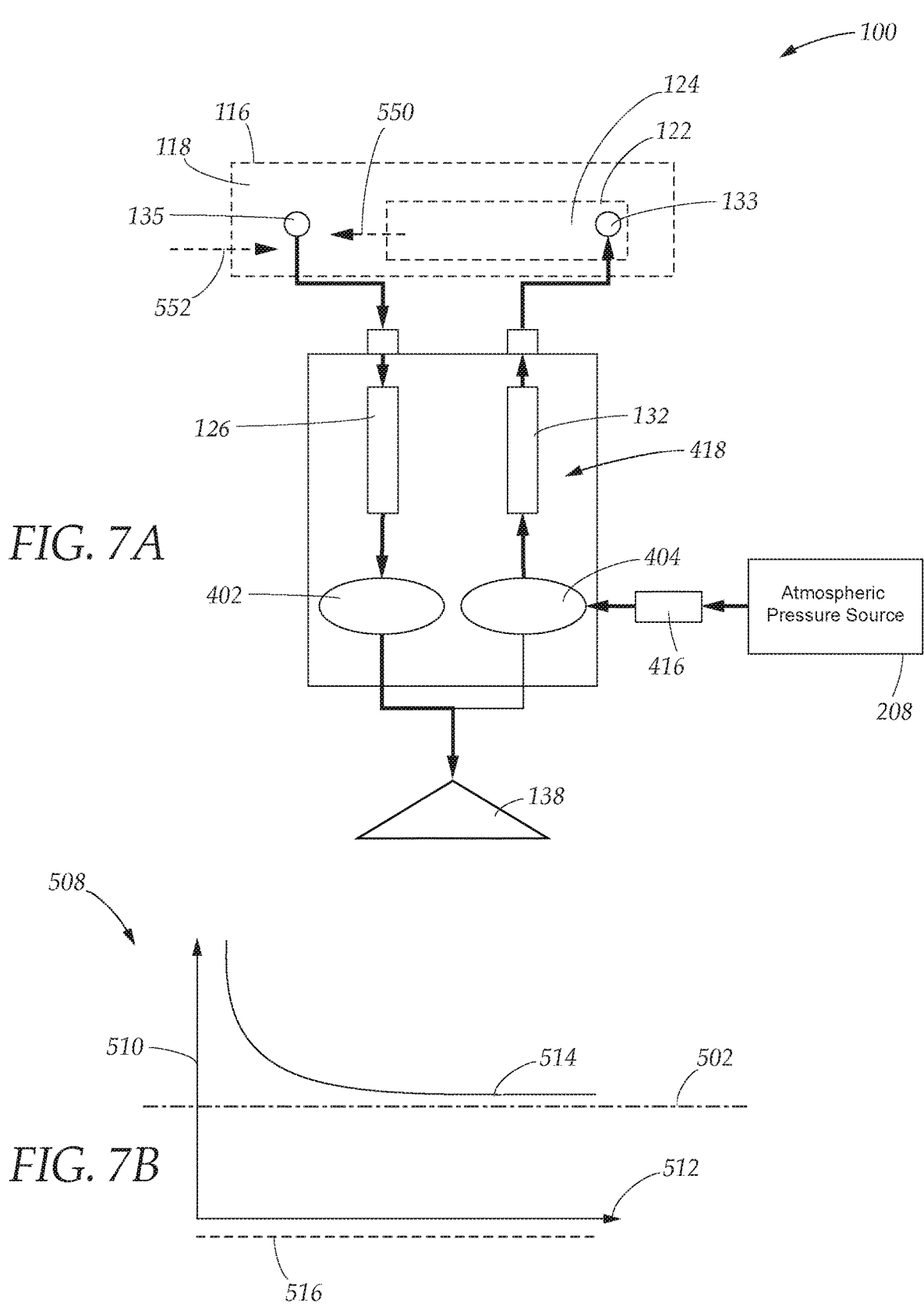
FIG. 7A is a schematic diagram of the system of FIG. 4A, shown with the seals of the system in a fourth seal integrity state, according to one or more examples of the present disclosure.
FIG. 7B is a graph illustrating fluid flow across a first fluid sensor and a second fluid sensor of the system of FIG. 4A, when in the fourth seal integrity state.

Referring now to FIGS. 7A and 7B, in some embodiments, the controller 400 is configured to identify the seal integrity of the outer seal 116 as leaking and to identify the seal integrity of the inner seal 122 as leaking (see, e.g., fluid leaking from the inner vacuum chamber 124 through the inner seal 122 at 550 and fluid leaking into the outer vacuum chamber 118 through the outer seal 116 at 552) when the comparison indicates the value of the first flow rate 514, in the equilibrium state, is positive and greater than the predetermined threshold 502, and the value of the second flow rate 516, in the equilibrium state, is negative.

Figure 2:
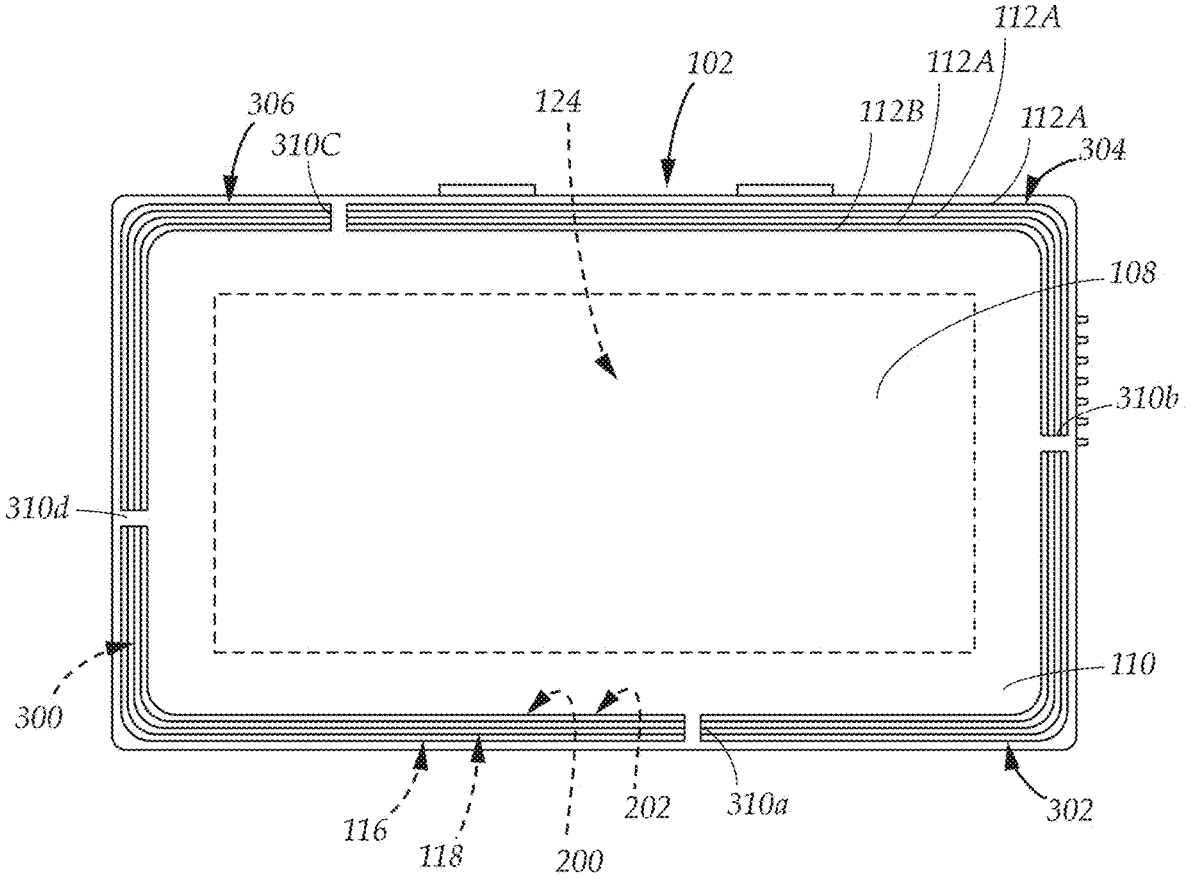
FIG. 2 is a plan view of a part forming tool used for validating seal integrity in a composite part manufacturing process, according to some embodiments of the present disclosure.

Referring back to FIGS. 1-3, in some embodiments, the seal validation system 100 further includes a failsafe vacuum chamber 200 disposed between the inner vacuum chamber 124 and the outer vacuum chamber 118. The failsafe vacuum chamber 200 is formed when vacuum conditions within the failsafe groove 112B, created when a failsafe valve 209 fluidically couples the failsafe vacuum chamber 200 to the vacuum source 138, force the vacuum bag 114 to press against the surrounding surface 110 of the part forming tool 102 contiguous with the failsafe groove 112B (e.g., against the edge of the failsafe groove 112B). The vacuum-induced contact between the vacuum bag 114 and the surrounding surface 110 creates a seal on both sides of the failsafe groove 112B, thus creating the failsafe vacuum chamber 200 within the failsafe groove 112B. This seal defines a failsafe seal 202 that extends continuously around the part forming tool 102 between the inner seal 122 and the outer seal 116. In some embodiments, a failsafe flow sensor 206 is fluidically coupled with the failsafe vacuum chamber 200 and configured to measure a failsafe flow rate (not shown) of a third fluid within the failsafe vacuum chamber 200.

Referring back to FIGS. 4A-7B, in some embodiments, the controller 400 is configured to identify the seal integrity of the failsafe seal 202 relative to the integrity of the inner seal 122 in a manner similar to that described above, but replacing the flow sensor data of the outer flow sensor 126 with the flow sensor data of the failsafe flow sensor 206.

Referring back to FIGS. 1-3, in some embodiments, the part forming tool 102 includes multiple outer grooves 112A, which can be divided into multiple fluidically isolated zones 300, 302, 304, 306. In some embodiments, one or more walls 310a-d or partitions are disposed transversely with respect to the outer grooves 112A to pass through and separate the outer grooves 112A into multiple segments that are fluidically isolated from each other. In certain embodiments, the outer grooves 112A within a given one of the zones 300, 302, 304, 306 may be fluidly connected to each other via one or more breaks or conduits, as described above.

In some embodiments, each one of the zones 300, 302, 304, 306 includes its own outer valve 402 and outer flow sensor 126, each configured to control and sense fluid into and out of the corresponding zones 300, 302, 304, 306. In this manner, the seal integrity of each one of the seals associated with the zones 300, 302, 304, 306 can be individually and separately monitored using the same principles described above.

Referring specifically to FIG. 3, in some embodiments, each one of the zones 300, 302, 304, 306 corresponds to an area or quadrant of the part forming tool 102. For example, one zone 300 may correspond to a right front quadrant of the part forming tool 102, a second zone 302 may correspond to a right rear quadrant of the part forming tool 102, a third zone 304 may correspond to a left rear quadrant of the part forming tool 102, and a fourth zone 306 may correspond to a left front quadrant of the part forming tool 102.

Figure 8:
FIG. 8 is a flow chart of one embodiment of a method for validating seal integrity.
Figure 8:
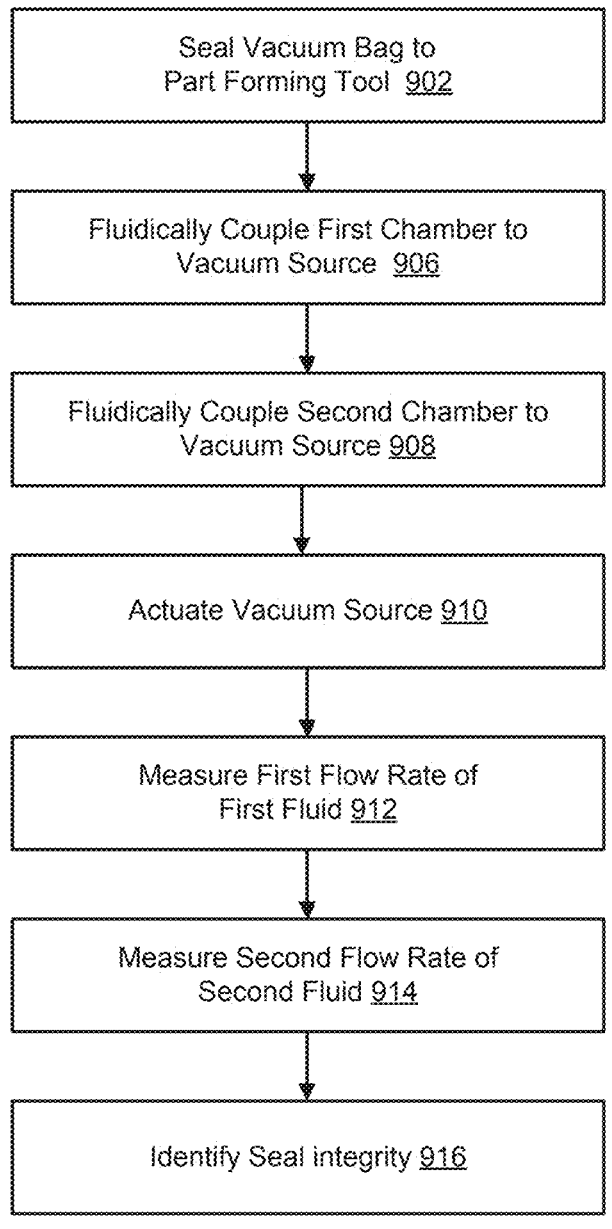

Referring now to FIG. 8, a method 900 for validating seal integrity in a composite part manufacturing process may include sealing 904 a vacuum bag 114 to the part forming tool 102 via an outer seal 116. In these and other embodiments, an outer vacuum chamber 118 is thus defined between the part forming tool 102 and the vacuum bag 114. The part forming tool 102 may include a supporting surface 108 against which a composite part 130 is formed and a surrounding surface 110 substantially surrounding the supporting surface 108.

The method 900 may further include sealing 904 a perimeter 107 of a caul sheet 106 to a vacuum bag 114 via an inner seal 122. The caul sheet 106 may overlay at least a portion of the composite part 130. In these and other embodiments, an inner vacuum chamber 124 is thereby defined between the part forming tool 102 and the part forming tool 102, the caul sheet 106, and the vacuum bag 114.

In some embodiments, the method 900 includes fluidically coupling 906 the outer vacuum chamber 118 to a vacuum source 138. In these and other embodiments, the method 900 for validating seal integrity may further include fluidically coupling 908 the inner vacuum chamber 124 to an atmospheric pressure source 208. In some embodiments, the method 900 includes actuating 910 the vacuum source 138 to draw a first fluid from the outer vacuum chamber 118.

In some embodiments, the method 900 includes measuring 912 a first flow rate 514 of the first fluid within the outer vacuum chamber 118 via an outer flow sensor 126 when the first fluid is drawn from the outer vacuum chamber 118. In some embodiments, the method 900 includes measuring 914 a second flow rate 516 of a second fluid within the inner vacuum chamber 124 via an inner flow sensor 132. The method 900 may include identifying 916 the seal integrity of the outer seal 116 and the inner seal 122 by comparing the first flow rate 514 and the second flow rate 516.

Figure 9:
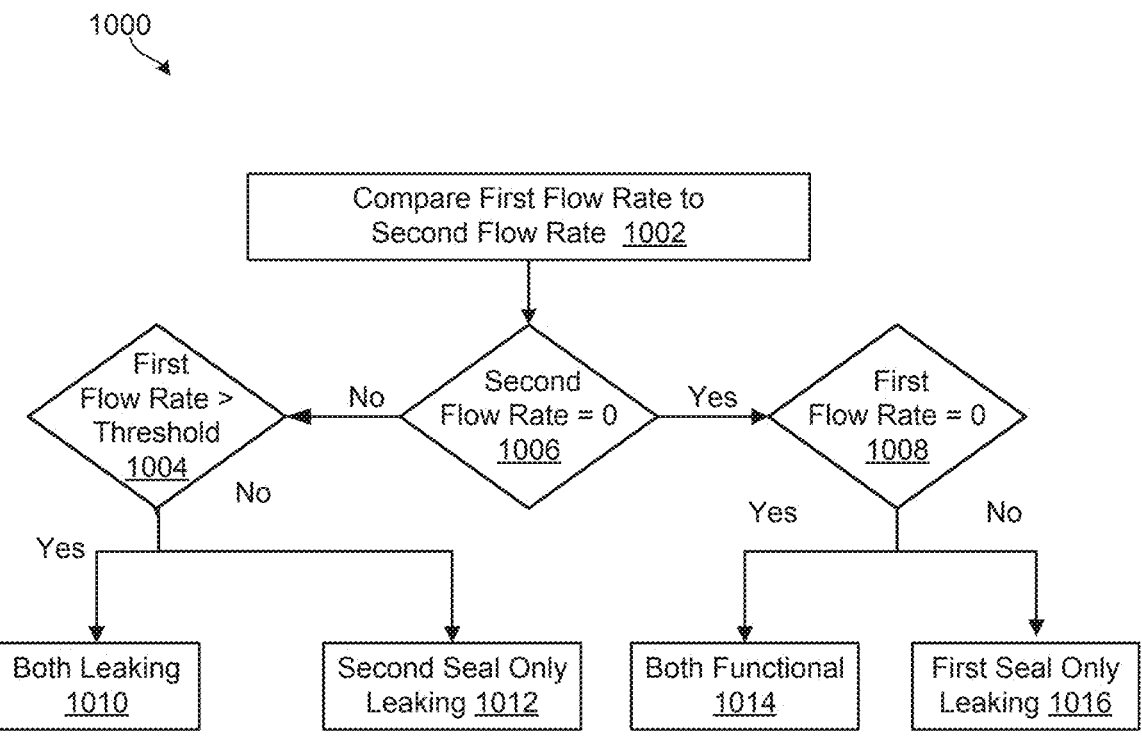
FIG. 9 is a flow chart of an embodiment of a method for identifying seal integrity.

Referring now to FIG. 9, in some embodiments, a method 1000 for identifying seal integrity of the outer seal 116 and the inner seal 122 includes comparing 1002 a value of the first flow rate 514, in an equilibrium state, to a value of the second flow rate 516 in an equilibrium state. In some embodiments, a next step of the method 1000 includes querying 1006 whether the second flow rate 516 is zero. If not, in some embodiments, the method 1000 includes querying 1004 whether the first flow rate 514 is greater than a predetermined threshold. If yes, the method 1000 may identify 1010 both the outer seal 116 and the inner seal 122 as leaking. If no, the method 1000 may identify 1012 only the inner seal 122 as leaking.

If the second flow rate 516 is zero, a next step of the method 1000 may include querying 1008 whether the first flow rate 514 is also zero. If yes, the method 1000 may identify 1014 both the outer seal 116 and the inner seal 122 as functional. If no, the method 1000 may identify 1016 only the outer seal 116 as leaking.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for validating seal integrity in a composite part manufacturing process, the system comprising:

a part forming tool comprising a supporting surface against which a composite part is formed, and a surrounding surface substantially surrounding the supporting surface;

a caul sheet comprising a perimeter, wherein the caul sheet is configured to overlay at least a portion of the composite part;

a vacuum bag coupled to the perimeter of the caul sheet such that the vacuum bag substantially surrounds the caul sheet and is disposed against at least a portion of the surrounding surface of the part forming tool;

an outer vacuum chamber defined between the surrounding surface of the part forming tool and the vacuum bag, wherein the vacuum bag is coupled to the surrounding surface of the part forming tool via an outer seal created by the outer vacuum chamber;

an inner vacuum chamber defined between the caul sheet, the vacuum bag, and the supporting surface of the part forming tool, wherein the perimeter of the caul sheet is coupled to the vacuum bag via an inner seal;

an outer flow sensor fluidically coupled with the outer vacuum chamber and configured to measure a first flow rate of a first fluid within the outer vacuum chamber;

an outer flow sensor fluidically coupled with the inner vacuum chamber and configured to measure a second flow rate of a second fluid within the inner vacuum chamber;

a vacuum source;

an outer valve selectively operable to fluidically couple and decouple the outer vacuum chamber and the vacuum source; and an inner valve selectively operable to:

fluidically couple and decouple the inner vacuum chamber and the vacuum source; and fluidically couple and decouple the inner vacuum chamber and an atmospheric pressure source.

2. The system according to claim 1, further comprising a controller configured to:

concurrently control operation of the outer valve to fluidically couple the outer vacuum chamber to the vacuum source, and control operation of the inner valve to fluidically decouple the inner vacuum chamber from the vacuum source and to fluidically couple the inner vacuum chamber to the atmospheric pressure source; and compare the first flow rate and the second flow rate when the outer vacuum chamber and the vacuum source are fluidically coupled, when the inner vacuum chamber and the vacuum source are fluidically decoupled, and when the inner vacuum chamber and the atmospheric pressure source are fluidically coupled, and identify the seal integrity of the outer seal and the inner seal based on the comparison of the first flow rate and the second flow rate.

3. The system of claim 2, wherein the controller is configured to identify the seal integrity of the outer seal as non-leaking and identify the seal integrity of the inner seal as non-leaking when the comparison indicates a value of the first flow rate, in an equilibrium state, and a value of the second flow rate, in an equilibrium state, are zero.

4. The system of claim 2, wherein the controller is configured to identify the seal integrity of the outer seal as non-leaking and identify the seal integrity of the inner seal as leaking when the comparison indicates a value of the first flow rate, in an equilibrium state, is positive and no more than a predetermined threshold, and a value of the second flow rate, in an equilibrium state, is negative.

5. The system of claim 2, wherein the controller is configured to identify the seal integrity of the outer seal as leaking and identify the seal integrity of the inner seal as leaking when the comparison indicates a value of the first flow rate, in the equilibrium state, is positive and greater than a predetermined threshold and a value of the second flow rate, in an equilibrium state, is negative.

6. The system of claim 2, wherein the controller is configured to identify the seal integrity of the outer seal as leaking and identify the seal integrity of the inner seal as non-leaking when the comparison indicates a value of the first flow rate, in an equilibrium state, is positive, and a value of the second flow rate, in an equilibrium state, is zero.

7. The system of claim 2, further comprising a third vacuum chamber defined between the part forming tool and the vacuum bag, wherein the vacuum bag is coupled to the part forming tool via a third seal, wherein a third flow sensor is fluidically coupled with the third vacuum chamber and configured to measure a failsafe flow rate of a third fluid within the third vacuum chamber.

8. The system of claim 7, wherein the controller is configured to identify the seal integrity of the inner seal as non-leaking and identify the seal integrity of the third seal as non-leaking when the comparison indicates a value of the second flow rate, in an equilibrium state, and a value of the failsafe flow rate, in an equilibrium state, are zero.

9. The system of claim 7, wherein the controller is configured to identify the seal integrity of the inner seal as non-leaking and identify the seal integrity of the third seal as leaking when the comparison indicates a value of the second flow rate, in an equilibrium state, is positive and no more than a predetermined threshold, and a value of the failsafe flow rate, in an equilibrium state, is negative.

10. The system of claim 1, wherein the inner valve is selectively operable between:

a first mode wherein the inner vacuum chamber is fluidically decoupled from the vacuum source and fluidically coupled to the atmospheric pressure source; and a second mode wherein the inner vacuum chamber is fluidically coupled with the vacuum source and fluidically decoupled from the atmospheric pressure source.

11. The system of claim 1, wherein the inner valve comprises:

a first flow regulator configured to regulate flow between the inner vacuum chamber and the vacuum source; and a second flow regulator configured to regulate flow between the inner vacuum chamber and the atmospheric pressure source, wherein the second flow regulator is separately controllable relative to the first flow regulator.

12. The system of claim 1, further comprising multiple outer vacuum chambers, multiple outer flow sensors and multiple outer valves, wherein the surrounding surface of the part forming tool comprises a plurality of zones each comprising a corresponding one of the multiple outer vacuum chambers, the multiple outer flow sensors, and the multiple outer valves.

13. The system of claim 1, wherein the part forming tool further comprises at least one groove formed in the surrounding surface, and wherein the outer vacuum chamber is defined within the at least one groove.

14. The system of claim 13, wherein the at least one groove is fluidically coupled with the vacuum source when the outer valve and the groove are open to the outer vacuum chamber such that the first fluid is drawn from the outer vacuum chamber through the groove when the outer valve is open.

15. The system of claim 14, wherein, when the at least one groove is fluidically coupled with the vacuum source, the vacuum bag is sealed against the at least one groove, and wherein the seal between the vacuum bag and the at least one groove defines the outer seal.

16. The system of claim 1, further comprising a third vacuum chamber defined between the part forming tool and the vacuum bag, wherein the vacuum bag is coupled to the part forming tool via a third seal, wherein a third flow sensor is fluidically coupled with the third vacuum chamber and configured to measure a failsafe flow rate of a third fluid within the third vacuum chamber.

17. The system of claim 2, wherein the inner valve is selectively operable between:

a first mode wherein the inner vacuum chamber is fluidically decoupled from the vacuum source and fluidically coupled to the atmospheric pressure source; and a second mode wherein the inner vacuum chamber is fluidically coupled with the vacuum source and fluidically decoupled from the atmospheric pressure source.

18. The system of claim 2, wherein the inner valve comprises:

a first flow regulator configured to regulate flow between the inner vacuum chamber and the vacuum source; and a second flow regulator configured to regulate flow between the inner vacuum chamber and the atmospheric pressure source, wherein the second flow regulator is separately controllable relative to the first flow regulator.

19. The system of claim 2, further comprising multiple outer vacuum chambers, multiple outer flow sensors and multiple outer valves, wherein the surrounding surface of the part forming tool comprises a plurality of zones each comprising a corresponding one of the multiple outer vacuum chambers, the multiple outer flow sensors, and the multiple outer valves.

20. The system of claim 2, wherein the part forming tool further comprises at least one groove formed in the surrounding surface, and wherein the outer vacuum chamber is defined within the at least one groove.

* * * * *